(12) United States Patent
Lotz et al.

(10) Patent No.: US 9,328,798 B2
(45) Date of Patent: May 3, 2016

(54) HEAT-REFLECTING FORCE TRANSMISSION BELT

(71) Applicant: ARNTZ BETEILIGUNGS GMBH & CO. KG, Hoexter (DE)

(72) Inventors: Florian Lotz, Brevoerde (DE); Willi Ollenborger, Bevern (DE)

(73) Assignee: Arntz Beteiligungs GmbH & Co., Hoexter (DE)

( * ) Notice: Subject to any disclaimer, the term of this patent is extended or adjusted under 35 U.S.C. 154(b) by 0 days.

(21) Appl. No.: 14/423,295

(22) PCT Filed: Aug. 15, 2013

(86) PCT No.: PCT/DE2013/000460
§ 371 (c)(1),
(2) Date: Feb. 23, 2015

(87) PCT Pub. No.: WO2014/029377
PCT Pub. Date: Feb. 27, 2014

(65) Prior Publication Data
US 2015/0211600 A1 Jul. 30, 2015

(30) Foreign Application Priority Data

Aug. 24, 2012 (DE) .......................... 10 2012 016 661

(51) Int. Cl.
*F16G 1/28* (2006.01)
*F16G 5/20* (2006.01)
(Continued)

(52) U.S. Cl.
CPC .. *F16G 1/12* (2013.01); *F16G 1/08* (2013.01); *F16G 1/21* (2013.01); *F16G 1/28* (2013.01); *F16G 5/04* (2013.01); *F16G 5/06* (2013.01); *F16G 5/10* (2013.01)

(58) Field of Classification Search
CPC ... C08L 9/00; C08L 2666/06; C08L 23/0815; C08K 3/04; C08K 5/14
USPC .................................. 474/237, 264, 202, 205
See application file for complete search history.

(56) References Cited

U.S. PATENT DOCUMENTS 1,935,817 A * 11/1933 Reynolds ............... B29D 29/00
156/138
5,405,299 A * 4/1995 Kubo ...................... F16H 7/023
474/205

(Continued)

FOREIGN PATENT DOCUMENTS

DE 102009044533 A1 5/2011
DE 10 2010 038 083 A1 4/2012

(Continued)

OTHER PUBLICATIONS

"White Fillers", Ullmann'S Encyklopedia of Industrial Chemistry, 1993, pp. 395-397, vol. A 23, VCH, Weinheim.

*Primary Examiner* — Henry Liu
(74) *Attorney, Agent, or Firm* — Whitham Curtis Christofferson & Cook, PC

(57) ABSTRACT

The use of metal particles inside the belt back (4) of a force transmission belt (1) serves primarily to protect the belt from overheating in transient temperatures of between 100° C. and approximately 400° C. which can occur during operation in motor vehicle engine compartments and in the heat radiation region of exhaust systems. To this end, the force transmission belt (1), which has a main body (3) made of at least one elastomeric material and having a sub-structure and a belt back (4), and a force transmission zone on the sub-structure, has lamella-type or flake-type particles made of metal, particularly aluminium, mixed into the elastomer at least in an outermost layer (5) of the belt back (4).

17 Claims, 2 Drawing Sheets

(51) Int. Cl.
*F16G 1/00* (2006.01)
*F16G 5/00* (2006.01)
*F16G 9/00* (2006.01)
*F16G 1/12* (2006.01)
*F16G 1/08* (2006.01)
*F16G 5/06* (2006.01)
*F16G 1/21* (2006.01)
*F16G 5/04* (2006.01)
*F16G 5/10* (2006.01)

(56) References Cited

U.S. PATENT DOCUMENTS

| | | | | |
|---|---|---|---|---|
| 7,137,918 B2* | 11/2006 | Nonnast | F16G 5/20 | 156/137 |
| 7,863,364 B2* | 1/2011 | Westwood | C08L 23/0815 | 474/191 |
| 7,985,152 B2* | 7/2011 | Di Meco | B29C 67/24 | 156/140 |
| 8,025,144 B2* | 9/2011 | Lewis | G09F 19/22 | 198/618 |
| 2004/0048708 A1* | 3/2004 | Nonnast | F16G 5/20 | 474/260 |
| 2010/0197435 A1 | 8/2010 | Gewald | | |
| 2010/0203994 A1* | 8/2010 | Fujikawa | C08K 3/04 | 474/263 |
| 2012/0258829 A1* | 10/2012 | Little | C08K 5/0025 | 474/266 |
| 2013/0085028 A1* | 4/2013 | Yamada | F16G 5/08 | 474/263 |
| 2013/0217528 A1* | 8/2013 | Matsumoto | F16G 1/10 | 474/263 |
| 2014/0206487 A1* | 7/2014 | Tomobuchi | C08K 3/00 | 474/205 |
| 2014/0287862 A1* | 9/2014 | Yamada | F16G 1/10 | 474/204 |
| 2014/0364261 A1* | 12/2014 | Lotz | F16G 5/20 | 474/264 |
| 2015/0024892 A1* | 1/2015 | Hineno | F16G 1/10 | 474/237 |

FOREIGN PATENT DOCUMENTS

| | | |
|---|---|---|
| DE | 10 2010 055 793 A1 | 6/2012 |
| EP | 1 129 308 A1 | 9/2001 |
| EP | 1 396 658 A1 | 3/2004 |

* cited by examiner

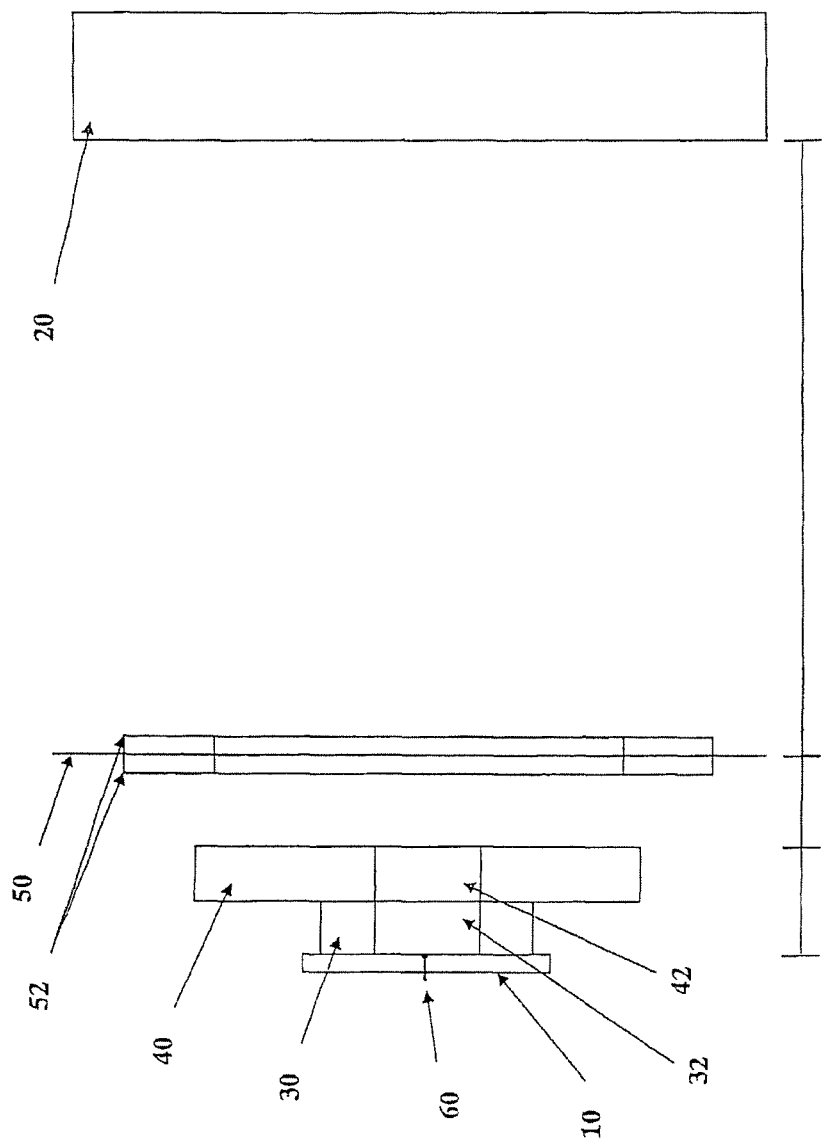

HEAT-REFLECTING FORCE TRANSMISSION BELT

FIELD OF THE INVENTION

The invention relates to a force-transmission belt with a main structure which is made of at least one elastomeric material and which comprises a substructure and comprises a belt backing, where there is, associated with the substructure, a force-transmission zone.

BACKGROUND

The invention relates to the field of force-transmission belts for belt drives. These can be flat belts, V-belts, V-ribbed belts or toothed belts. Belts for belt drives generally have to meet particular dynamic-mechanical requirements. During operation the belts experience slight internal heating due to interior shear forces, but in modern elastomer belts this heating is not problematic. Belts of the type concerned here are often used in high-performance machinery or in engines. Particularly in vehicle engines for land vehicles, watercraft, and aircraft they can be exposed to heat from exterior sources, resulting from a high operating temperature of the engine, and in the case of internal combustion engines also from high exhaust-gas temperatures. The belt material is subject to additional stress from these exterior conditions. There is the risk that the belt ages more rapidly, with a resultant reduction of operating lifetime. The belts in engine compartments of motor vehicles are exposed briefly and occasionally to high temperatures up to about 300 or 400° C. The resistance of elastomer belts to high temperatures is therefore a specific problem.

Force-transmission belts of this type are traditionally often produced from rubber elastomers, and specifically preferably those of the M type or of the R type, inclusive of natural rubber (NR). In the prior art these rubbers are often carbon-black-filled to provide a good price-performance ratio in relation to the desired mechanical properties.

It is already known that resistance to temperature change at high and/or low temperatures can be improved by using elastomers which have been optimized particularly for that purpose and which have better capability of withstanding said temperatures. EP 1 129 308 A2 discloses a force-transmission belt which withstands temperatures from −40 to about 140° C. for at least 500 hours. For this, specific copolymers are used which comprise nitrile groups and optionally fluorinated vinyl groups or unsaturated carboxylic ester groups. The use of specific synthetic elastomers for increasing resistance to temperature change has the attendant disadvantage that certain mechanical properties cannot be optimized at the same time as the resistance to temperature change. These specific synthetic elastomers are also often more expensive to produce.

SUMMARY

The invention is therefore based on the object of avoiding the disadvantages within the prior art and providing a force-transmission belt which has better protection from overheating during operation in high-performance engines, specifically in engine compartments of motor vehicles, and which can nevertheless use traditional belt elastomers. The intention is that when the belt is subject to the adverse conditions mentioned it in particular absorbs less radiated heat or infrared radiation than a conventional belt.

The object is achieved with the aid of a force-transmission belt of the type mentioned in the introduction where at least one outermost layer of the belt backing comprises metal particles in platelet form or in flake form mixed into the relevant elastomer. The expression mixed "at least into the outermost layer" of the belt backing means that the metal particles are present either only in the outermost layer of the belt backing or in the entire belt backing or additionally also in other zones of the belt. The presence of the metal particles in platelet form or in flake form in the outermost belt-backing layer is of functional importance in order to provide direct reflection of heat at that location and to prevent, or restrict, absorption of heat via the belt. The outermost layer with the metal particles provides shielding from heat, and specifically to a substantial extent from the infrared radiation component.

The structure of force-transmission belts of this generic type is generally such that the entire elastomeric main structure is composed of one or more elastomer materials. The main structure here extends substantially across the entire cross section of the belt, and there can be overlayers and/or coatings present here not only on the reverse side of the belt but also on the force-transmission zone, or taking the form of sheathing around the entire belt. Between the belt backing and the substructure, with the force-transmission zone, the arrangement generally has tension-member systems which can take the form of strips or of individual strands. The location of the tension-member systems is between belt backing and substructure, and they can have their own embedding elastomer mixture. In this type of embodiment there is an intermediate layer made of the tension-member-system-embedding material between belt backing and substructure. The belt backing, too, can be composed of a plurality of layers of material and by way of example can comprise an intermediate layer. Among other possibilities, there can by way of example be reinforcing fibers incorporated into the various layers or intermediate layers or individual layers can comprise pigment. For the substructure, too, there are known multilayer structures.

In a first embodiment the location of the metal particles present in platelet form or in flake form in the invention is within the elastomer material or within the plurality of elastomer materials of the entire main structure. The metal particles then have a distribution within the entire cross section of the main structure of the belt, and the concentrations of the metal particles here can be different in certain regions or layers of the main structure, and in particular can be higher in the belt backing, particularly preferably in the outermost layer of the belt backing.

Alternatively it is moreover possible that the metal particles in platelet form or in flake form mixed into the relevant elastomer are present only within the belt backing, and preferably only within an outermost layer of the belt backing, while other regions of the main structure are formed from metal-free elastomers. This embodiment has the advantage that the metal particles are used only where they are required and where they have optimal effect. Metal material usage is lower than in the first example.

The metal particles in platelet form or in flake form can be the materials known commercially as flakes. These flakes or platelets can be produced in various ways. Firstly, they can derive from a paring process. The platelets or flakes are then flat chips. This group also includes polishing bronzes. In another production process, metal is comminuted or pulverized to give small particles, and then subjected to shape-change processes in mills and optionally further comminuted. There are dry-milling processes and wet-milling processes known for this purpose. The products are platelets or lamellae, or flakes, often with a thickness of only about one micrometer and diameters of about 20 to 100 µm ($D50_{num} \leq 100$ µm or sieving index about 70-80).

The metal particles of the invention are composed of elemental metals or metal alloys, i.e. not of metal oxides. However, they can have a coating for corrosion protection and for purposes of better bonding into an elastomer; it is preferable that the metal particles have a non-conductive coating, which more preferably uses silicon dioxide, aluminum oxide, or polymers, for example acrylates. The coating using $SiO_2$ can be a glass encapsulation. The encapsulation or coating serves primarily for corrosion protection; an oxidic coating can improve bonding into the elastomer.

The metal particles of the invention are preferably composed of gold, copper, zinc, bronze, or brass, and in a particularly preferred embodiment are composed of aluminum. Aluminum is preferred because it has very good capability for reflecting infrared radiation.

Aluminum particles of the type preferred here are known in the form of industrial aluminum flakes. Aluminum flakes are used as foaming agent in the production of lightweight concrete and specialty mortars, and are used in the chemical industry, in particular for Grignard reactions and highly exothermic organometallic reactions of various types. They are also used as reducing agents, and in many pyrotechnical products.

Surprisingly, it has been found that said particles can be used without risk in force-transmission belts for vehicle engines, since they are in dispersed, and thus protected, form within the elastomers.

A distinction is made in relation to the shape of the particles of metal flakes between what is known as the "cornflakes shape", an irregular shape, and what are known as "silver-dollar types" with a smooth surface. The precise shape of the flakes or platelets does not appear to have any decisive effect on the heat-reflecting properties. The effect is decisively dependent on the platelet shape per se in conjunction with concentration and size (diameter).

Accordingly, it is particularly preferable that the metal particles are present in the elastomer of the metal-containing main structure or main-structure region overall, and preferably in the outermost layer of the belt backing, at a concentration of from 1 phr to 25 phr, preferably from 5 phr to 12 phr.

It is moreover preferable that at least 50% of the particles do not have a length exceeding 100 µm in any measurement direction, preferably do not have a length exceeding 60 µm in any measurement direction. This corresponds to a (numeric) median particle size, determined by laser diffractometry, for example, of $D50_{num} \leq 100$ µm, preferably $D50_{num} \leq 60$ µm. The particle size restriction can alternatively also be characterized by a sieving index. It is preferable that the sieving index of the particles used is not greater than 71 (95-100% of material passes through). If particles are too large the belt material is more susceptible to cracking, with the possibility of resultant belt failure or significant reduction of operating lifetime. Surprisingly, it has been found that the metal particles uniformly dispersed in at least the outermost belt-backing layer provide astoundingly good heat reflection, higher than that provided by a "white"-filled belt material comprising $SiO_2$- and/or $TiO_2$-based fillers.

Heat reflection is considerably better when the metal particles in platelet form or in flake form are used in the invention than when the identical mass of metal powders is used. This effect is already apparent without any intentional orientation of the platelets or flakes in the elastomer. However, it is assumed that a certain orientation of the metal particles takes place automatically during the production of the belt or belt backing. In particular during the calendering of the belt backing the platelets arrange themselves "flat", i.e. preferentially parallel rather than perpendicular to the layer surface. A similar orientation also arises during the casting of a platelet-containing or flake-containing layer, particularly if the outermost layer with the metal particles is very thin, for example thinner than 1 mm.

In a preferred embodiment only the outermost layer of the belt backing comprises the metal particles of the invention. The thickness of this layer is preferably up to 1 mm, more preferably up to 0.5 mm, and particularly preferably only up to 0.2 mm ($\leq 0.2$ mm).

The increased heat reflection protects the belt from overheating, and makes it unnecessary to use high-temperature-resistant elastomers, for example with fluorinated content, while favoring the conventional elastomers, which do however have metal particles at least in the outermost layer of the belt backing.

It is preferable that the elastomer comprising the metal particles is an M elastomer, an R elastomer, inclusive of natural rubber (NR), a halorubber, or a polyurethane. It is possible that a plurality of elastomers arranged in the belt in various spatial regions (zones) comprise metal particles in platelet form or in flake form. All rubbers, inclusive of natural rubber, are in principle suitable for use in the invention.

In other preferred embodiments the preferred elastomer comprising the metal particles of the invention comprises at least 50% by weight of an elastomer of the M group or a polyurethane. Particularly preferred elastomers are free-radical-crosslinked EPM and, respectively, EPDM elastomers.

The term "elastomer" here means a polymer that has been crosslinked to give a three-dimensional network and that does not have purely thermoplastic properties, such as fusibility. There can be certain proportions of thermoplastics mixed into the material, while the elastomer overall does not lose its characteristic elastomer properties. However, the proportion of thermoplastic should not exceed 30% by weight, preferably 20% by weight.

The elastomer moreover comprises a preferably pale-colored filler, in particular a silica material or a fine-particle silicon oxide, preferably fumed silicon dioxide in non-functionalized and preferably functionalized form. Silica-based fillers are described in "Ullmann's Encyclopedia of Industrial Chemistry", VCH, Weinheim 1993, vol. A 23, page 395 ff. under the heading "Aktive weiße Füllstoffe" [Active white fillers] (chapter with heading "Rubber, 4.3.3.1.").

It is preferable to use about 10 to 90 phr of this type of filler. The surface area measured by the BET method should be greater than or equal to 50 $m^2/g$. The filler, or portions of the filler, can have been surface-functionalized, as is known in the prior art.

It is moreover preferable that the elastomer of the entire belt structure, or at least the elastomer into which the metal particles have been embedded in the invention, comprises no dark-colored fillers and in particular no carbon black. Dark-colored fillers and carbon black adversely affect the heat-reflective action of the metal particles, and should therefore be avoided.

As is well known in the prior art, the elastomer mixtures can moreover comprise the conventional proportions by weight of additives and auxiliaries. Among these are plasticizers, dispersing agents, masticating agents, adhesion promoters, aging inhibitors, release agents, lubricants, stabilizers, crosslinking accelerators, crosslinking retarders, dyes (preferably pale-colored), reinforcing fibers, crosslinking initiators, particular examples of these being free-radical generators, and activators.

The force-transmission belts of the invention can have any of the familiar shapes, i.e. they can in principle be flat belts, V-belts, or toothed belts. Preference is given to V-belts, V-ribbed belts, toothed belts, and belts comprising a plurality of V-belts, and particular preference is given to V-belts and V-ribbed belts.

Since the invention is based on the discovery that embedded metal particles can be used to provide effective protection of force-transmission belts made of conventional rubber elastomers or polyurethane during operation under conditions of thermal stress, in particular under conditions of repeated brief thermal stress at temperatures up to about 400° C., the invention further comprises the use of metal particles within the belt backing of a force-transmission belt for protection from overheating in respect of temperatures which arise briefly in vehicle engine compartments and in the heat-emission region of exhaust systems, where said temperatures are above 100° C., sometimes above 200° C., and briefly up to about 400° C.

Particular preference is given to the use of industrial aluminum flakes, of aluminum platelets, of flat aluminum chips, or of polishing bronze with particle diameters ≤100 μm, i.e. with sieving index 100, preferably sieving index 71, more preferably with median particle diameter $D50_{num} \leq 100$. The details of the inventive use are as described previously with reference to the force-transmission belt of the invention.

The invention is explained in more detail below with reference to embodiments and with reference to the attached drawings.

BRIEF DESCRIPTION OF THE DRAWINGS

In the drawing:

FIG. 1a—shows a sketch of a cross section of a ribbed belt with metal particles in the outermost belt-backing layer;

FIG. 1b—shows a sketch of a cross section of a V-belt with metal particles on the textile coating;

FIG. 2—shows a test rig for a heat-reflection test.

DETAILED DESCRIPTON

Figure 1:
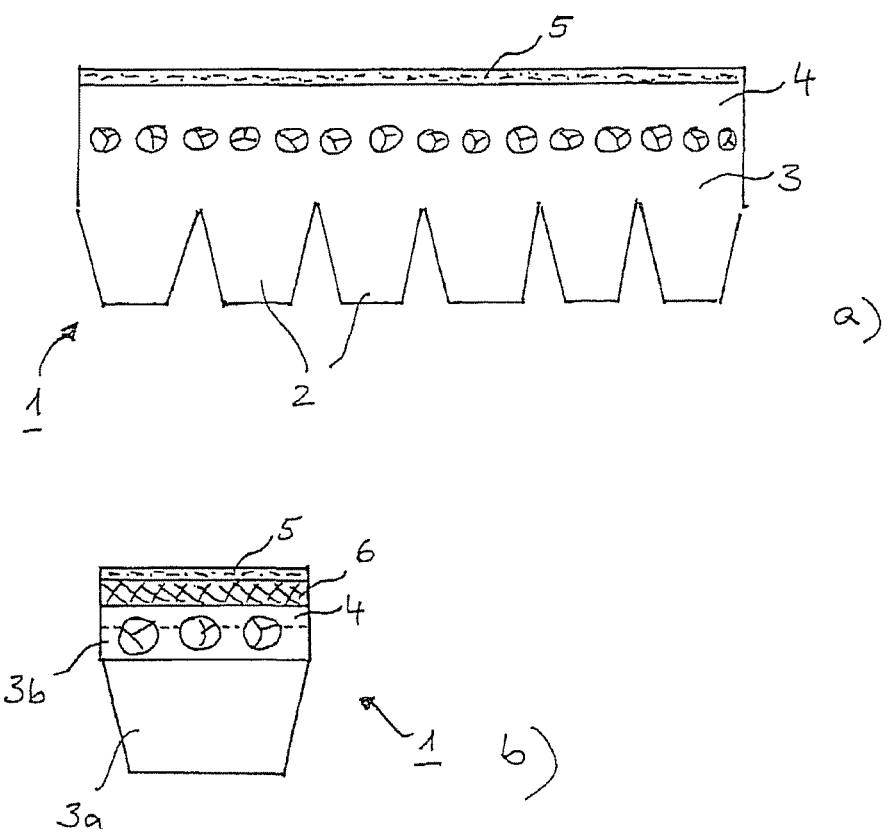
FIG. 1—shows sketches of belt cross sections.

FIG. 1a is a diagram of a cross section through a force-transmission belt 1 in the form of a V-ribbed belt with in this case six ribs 2. The elastomeric main structure 3 comprises the ribs 2 formed from a unitary elastomeric material, and also comprises the entire substructure and the belt backing 4. Only the outermost layer 5 of the belt backing 4 comprises metal particles in platelet form mixed into the elastomer, in this case aluminum flakes ("lamellar aluminum powder", producer: Eckart Effect Pigments, Germany) with sieving index (97-100%) 71 micrometers and with a particle size distribution D50 of about 47 micrometers. The thickness of the layer 5 is 1 mm. As a result of calendering, the aluminum flakes are not completely unordered, but instead have, statistically, a relatively high degree of longitudinal orientation with respect to the layer.

FIG. 1b shows another embodiment in a diagram of a cross section through a force-transmission belt 1 in the form of a V-belt. The V-belt 1 here is composed of various elastomer regions, namely an elastomer region in the tapered section 3a, a cord-embedment section 3b, and the outermost layer 5, which in turn comprises the aluminum flakes in lamellar form or in platelet form. The belt backing 4, made of the same elastomer as the cord-embedment layer 3b, has been covered by a textile overlayer 6. The outermost layer 5 of the belt backing 4 here therefore takes the form of a coating of the textile overlayer 6. Alternatively, the textile overlayer 6 can have been saturated completely by the metal-particle-containing elastomer material for the outermost layer 5.

FIG. 2 is a diagram of the test apparatus used to study the test sections made of elastomer materials with embedded particles in respect of heat reflection.

EXAMPLES

1.) Example of parent mixture

Mixture 1

| Constituent | Content (phr) |
|---|---|
| EPDM1: ethylene-propylene-diene terpolymer, ethylene content 50%, diene content* 4.9% | 55 |
| EPDM2: ethylene-propylene-diene terpolymer, ethylene content 70%, diene content* 4.9% | 45 |
| Silica-silane composition: VN2 + VTEo** | 50 |
| Plasticizer: mineral-oil plasticizer | 12 |
| TMQ antioxidant 2,2,4-trimethyl-1,2-dihydroquinoline | 0.5 |
| Stearic acid | 4 |
| ZnO | 2 |
| MgO | 4 |
| Ionic activator: zinc dimethacrylate | 12 |
| Peroxide crosslinking agent: di(tert-butylperoxyisopropyl)benzene | 4 |

*Diene = ENB
**VN2 + VTEo = a VN2-silica filler (BET specific surface area: from 125 to 130 m²/g, prereacted or premixed with 8 phf of vinyltriethoxysilane 2.) Individual examples with various inventive and non-inventive particles for increasing heat reflection for examples b) to g) with the parent mixture together with the stated content of heat-protection particles in phr. A corresponding carbon-black-filled rubber is used as reference example a).

| Example | Type of particle | Properties | ΔT (° C.) |
|---|---|---|---|
| a) reference example | carbon black, standard-quality EPDM, peroxide-crosslinked, without fibers | carbon-black-filled EPM, standard belt rubber, without heat-reflection particles | 0 (reference) |
| b) individual and mixed metal oxides | Al₂O₃ or TiO₂, SiO₂, mixtures thereof, in each case 10 phr | diameter about 40-50 μm | 12 |
| c) tin | pulverulent, 10 phr | — | 18 |
| d) aluminum powder | standard powder, 10 phr | sieving index 71 μm | 26 |
| e) coated aluminum, powder | Al, SiO₂-coated, 5 phr | round particles, median diameter 50 μm | 26 |
| f) coated aluminum, powder | Al, SiO₂-coated, 10 phr | round particles, median diameter 50 μm | 32 |
| g) aluminum flakes (lamellae) | Al, encapsulated with mineral layer, 10 phr | $D50_{num} \leq 50$ μm, round platelets | 39 |

Heat Reflection Test—FIG. 2

The materials for abovementioned examples a) to g) were used in each case to mold sheets 10, which were arranged at a defined distance from a hotplate 20. The layer thickness of each of the sheets 10 made of the sample material was 2 mm. The distance from the surface of the respective sheet 10 to the surface of the hotplate 20 in the test rig was 92 mm. Various measures were adopted within this rig in order substantially to exclude the effect of any convected heat. To this end, the sheet 10 made of the sample material was adhesive-bonded to an annular spacer 30 made of rubber with layer thickness 6 mm. The internal diameter 32 of the ring was 35 mm. In front of the rubber spacer 30 the arrangement had an HDF sheet 40 of thickness 6 mm with a central hole 42. The HDF surface was completely covered with aluminum foil. The central hole 42 with diameter likewise 35 mm was arranged so as to be coterminous with the opening in the spacer 30, so that the radiated heat—in essence infrared radiation—emitted from the hotplate 20 could be incident on the sheet 10 only in the region of the central holes. In an additional measure for shielding from convected heat, a cellophane foil 50, held by the metal frame 52, was also arranged between hotplate 20 and HDF sheet 40. The cellophane foil is a Natureflex NP foil, layer thickness 0.2 mm; its distance from the HDF sheet surface facing toward the hotplate was 10 mm, and its distance from the sample material surface was 22 mm. The distance between hotplate 20 and cellophane foil 50 was accordingly 70 mm. A temperature sensor 60 was used to record the temperature rise of the sample material resulting from the radiated heat from the hotplate 20. To this end, the temperature sensor 60 had been let into the frontal side facing toward the radiation within the sample sheet 10.

The test rig simulates a situation in an engine compartment where an exhaust system—represented here by the hotplate 20 arranged at a distance—can reach temperatures up to about 500° C. The hotplate 20 was heated to 500° C. The temperature of the sheet 10 here, measured by the heat sensor 60, approached asymptotically, over about 13 to 15 minutes, a final value which was recorded when constant temperature was reached (temperature change less than 0.1° C. after 1 minute). This test procedure was repeated a number of times for all of the materials in the examples, and the average value was calculated for each material. The average temperature value for the carbon-black-filled elastomer was set at zero, as reference. The ΔT values for each example state the difference between the final temperature values for the reference material and for the respective material in the example; this temperature difference was always negative, i.e. the temperature rise of the sample materials b) to g) was less than that of the reference material. This showed that the presence of metal particles in itself provides an advantageous effect, which was further amplified by up to 50% when appropriate particles in platelet form or in flake form were used. The presence of the metal flakes provided significantly increased heat reflection, and a belt equipped therewith therefore has better protection from overheating during operation at elevated temperature.

What is claimed is:

1. A force-transmission belt with a main structure made of at least one elastomeric material and which comprises
    a bottom section with a force-transmission zone, and
    a belt backing on the reverse side of the belt from the bottom section and comprising an elastomer, wherein the belt backing comprises metal particles in platelet form or in flake form mixed into the elastomer.
2. The force-transmission belt as claimed in claim 1, wherein said metal particles are composed of aluminum.
3. The force-transmission belt as claimed in claim 1, wherein said metal particles are present in the elastomer of an outermost layer of the belt backing at a concentration of from 1 parts per hundred of rubber (phr) to 25 phr.
4. The force-transmission belt as claimed in claim 1, wherein at least 50% of said metal particles do not have a length exceeding 100 micrometers in any measurement direction.
5. The force-transmission belt as claimed in claim 1, wherein said elastomer is selected from the group consisting of an M elastomer, an R elastomer, a halorubber and a polyurethane.
6. The force-transmission belt as claimed in claim 1, wherein the elastomer of the belt backing comprises a pale-colored filler.
7. The force-transmission belt as claimed in claim 1, wherein said elastomer of the belt backing or the elastomer of an outermost layer of the belt backing is not of dark color and has not been filled with dark-colored fillers or with carbon black.
8. The force-transmission belt as claimed in claim 1, wherein said outermost layer of the belt backing is up to 1 mm thick.
9. The force-transmission belt as claimed in claim 1, wherein said belt is selected from the group consisting of a V-belt, a V-ribbed belt, a toothed belt, and a plurality of V-belts.
10. The force-transmission belt as claimed in claim 1, wherein said metal particles are at a concentration sufficient to provide protection from overheating in respect of temperatures >100° C. which arise briefly during operation in vehicle engine compartments and in the heat-emission region of exhaust systems.
11. The force-transmission belt as claimed in claim 1, wherein said metal particles are aluminum flakes with diameters smaller than or equal to 100 micrometers.
12. The force-transmission belt as claimed in claim 1, wherein at least 50% of said metal particles do not have a length exceeding 60 micrometers in any measurement direction.
13. The force-transmission belt as claimed in claim 6, wherein said pale-colored filler is an $SiO_2$-containing filler.
14. The force-transmission belt as claimed in claim 6, wherein at least the elastomer of an outermost layer of the belt backing comprises a pale-colored filler.
15. The force-transmission belt as claimed in claim 3, wherein said metal particles are present in the elastomer of the outermost layer of the belt backing at a concentration of from 5 phr to 12 phr.
16. The force-transmission belt as claimed in claim 1, wherein the metal particles are present in an outermost layer of the belt backing.
17. The force-transmission belt as claimed in claim 1, wherein the metal particles are only present within the belt backing.

* * * * *